United States Patent Office 3,462,574
Patented Aug. 19, 1969

3,462,574
CABLE SEAM SOLDERING APPARATUS
David A. Hughes, Sun City, Ariz., assignor to Western Electric Company, Incorporated, New York, N.Y., a corporation of New York
Filed Jan. 10, 1967, Ser. No. 608,444
Int. Cl. B23k 13/02
U.S. Cl. 219—9.5    11 Claims

ABSTRACT OF THE DISCLOSURE

A cable seam soldering apparatus wherein the spacing of a heating coil from the seam of an advancing cable is made independently adjustable at either end by supporting the heating coil from a gimbal mounting.

---

This invention relates to cable seam bonding or soldering apparatus and has for its object an improved apparatus for positioning an induction heating coil used for the soldering operation.

In the manufacture of steel-sheathed telephone cable, such as the composite sheath cable disclosed in U.S. Patent 2,589,700 which issued Mar. 18, 1952, to H. G. Johnstone, the longitudinally wrapped steel sheathing must be continuously soldered at the seam in order to provide a vapor-tight barrier for the cable. While high temperatures are required for proper soldering, the heating of the cable must be controlled carefully in order to prevent charring of the cable insulation. Among the problems encountered in the soldering operation are those of restarting the cable line without causing defects in the soldering (and without charring the cable insulation) and also that of controlling the spacing between a heating coil and the moving cable, especially when variations of the position of the outer diameter of the cable sheathing occur.

The solution to these problems is complicated by the high currents required by the induction heating coil, about 500 amperes, which necessitates using large, rigid conductor bars for connecting the coil to its step-down transformer which in turn prevents independent movement of the coil.

In U.S. Patent 2,758,189, dated Aug. 7, 1956, there is disclosed a cable seam soldering appaartus wherein the transformer and induction heating coil were mounted on a common support which was movable about two axes, one lying in a plane parallel to the cable, and the other at right angles thereto. A shoe riding on the cable controlled the position of the support about the parallel axis to maintain the coil at a substantially constant or fixed position from the cable seam. This provided uniform heating of the cable during the soldering operation.

By rotating a cam, the support could be moved about the other axis to tilt one end of the coil away from the cable to allow for the starting condition. This latter arrangement also permitted the establishment of a temperature gradient along the cable, with that portion of the cable about to pass out from beneath the coil, being subjected to the maximum heating to thereby assure proper soldering of the seam. Once the cable was in motion, the cam could be adjusted to reduce the angle of tilt and make the coil more nearly parallel to the cable. To prevent overheating and charring of the insulation, however, a slight tilt was preferably maintained, even when the cable was in motion.

While the previous invention was successful, the increasing demands of modern cable technology pose additional problems which have had to be overcome. In particular, cables currently in production are more sensitive to overheating and thus more susceptible to insulation charring than has heretofore been the case.

In the above-described patent, a shoe riding the surface of the cable controlled the position of the heating coil above the cable. Thus, for example, if due to some manufacturing malfunction the diameter of the cable were to increase temporarily, the shoe at the exit end of the cable would be forced upward and the heating coil would be correspondingly moved further from the normal path of the cable to maintain an essentially constant heating of the cable seam.

Unfortunately, the heating coil has a finite longitudinal dimension, typically two feet, and in the prior arrangement the increase in cable diameter would have already decreased the distance between the cable seam and the entering end of the heating coil, prior to the arrival of the irregularity at the shoe. Thus, a portion of the cable would have already overheat before the shoe had time to react to move the coil upward and away from the nominal position of the cable seam. To prevent damage to the more sensitive cables currently in production, it is therefore evident that the provision of an improved apparatus is desirable.

In accordance with the general features of the invention, the transformer and induction heating coil are mounted on a common support which is capable of simultaneous rotation about two axes, one lying in a plane parallel to the axis of the cable and the other at right angles thereto. This simultaneous rotation is made possible by a gimbal-type universal pivot, centrally located along the common support. A pair of shoes located at opposite ends of the support ride on the surface of the cable and, together with the universal pivot, permit independent control of the common support at either end of the heating coil. Any variation in the cable diameter is immediately detected by the first shoe and the entering end of the heating coil moved accordingly to prevent overheating. The shoe located at the exit end of the cable similarly responds to the variation as it passes thereunder to maintain the seam to coil distance substantially constant, preventing overheating at the exit end or soldering location. A screw adjustment is provided at the entering end of the cable to permit the corresponding end of the heating coil to be tilted, if this is desired.

These and other features of the invention will be more fully understood from the following detailed description and appended claims taken in conjunction with the accompanying drawings, in which:

Figure 1:
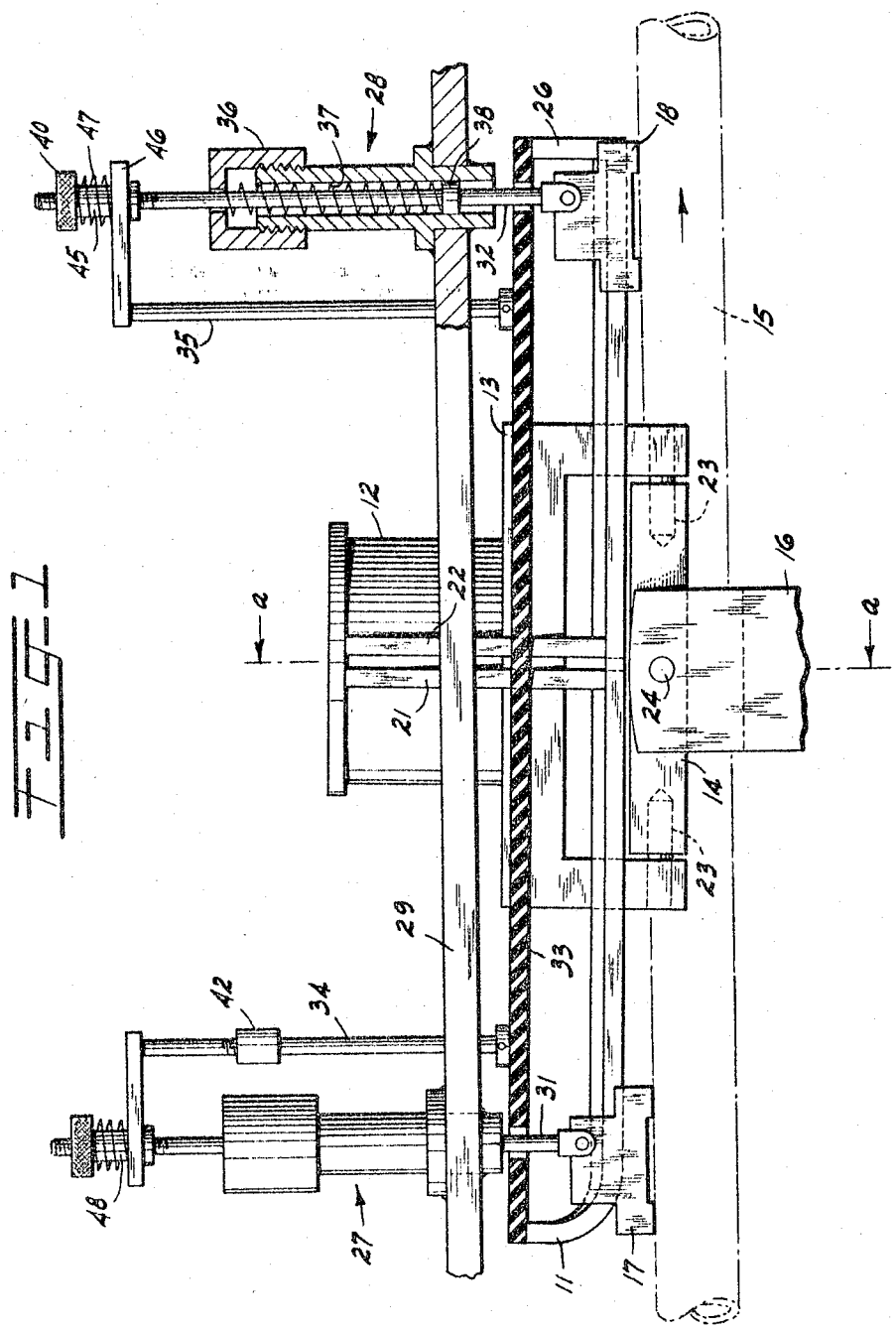
FIG. 1 is a front elevational view of the cable soldering apparatus incorporating the general features of the invention.
Figure 2:
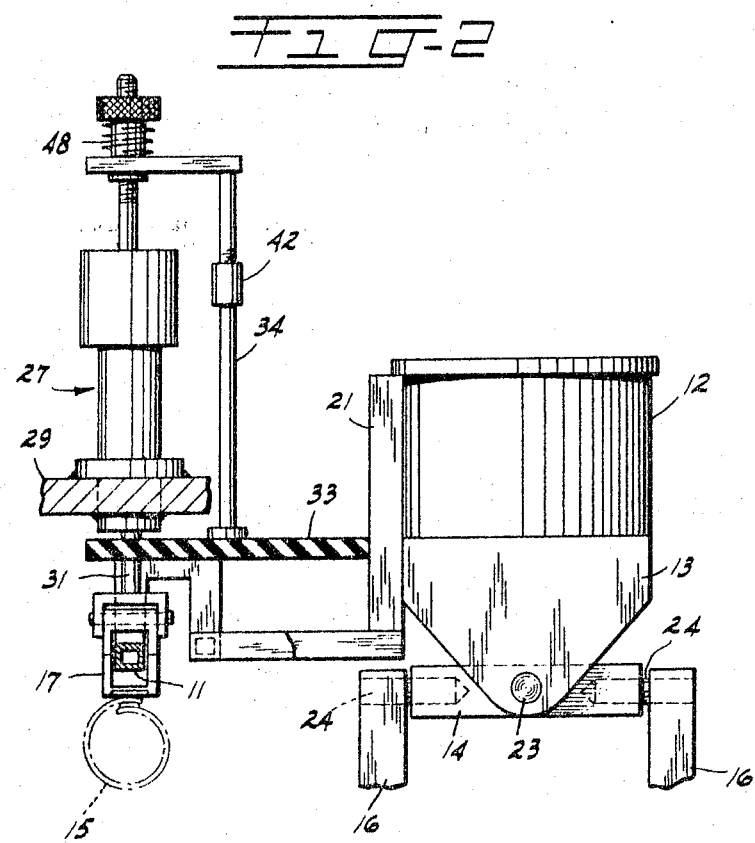
FIG. 2 is a cross-sectional view of FIG. 1 taken along the plane of line a—a.

Referring now to FIGS. 1 and 2 of the drawings, in general, the apparatus comprises an elongated heating coil 11 and its associated step-down transformer 12 mounted on a common support 13.

The construction and operation of such transformers and heating coils is well known and will not be discussed in detail. Means are usually provided to prevent the temperature of the induction coil from exceeding a predetermined maximum value. Typically, the induction coil has a hollow cross-section and a coolant, such as water, is forced through the coil to maintain the desired temperature.

The support 13 is pivoted to a cruciform member 14 to be rotatable about an axis in a plane parallel to a cable 15. The cruciform member 14 is, in turn, pivoted to a bifurcated base member 16 so that it, and support 13 may be rotated about an axis perpendicular to the cable 15. A pair of shoes 17 and 18 are located at either end of the coil 11 and slide on the cable 15. The shoes 17 and 18 are utilized for rotating the support 13 and the cruciform member 14 about the two axes.

More specifically, the elongated induction heating coil 11 is connected to the output terminal bars 21 and 22 of the transformer 12, which is in turn mounted on the support 13. The support 13 pivots about a pair of pins 23—23 set in the cruciform member 14. The cruciform member 14 itself pivots about a pair of pins 24—24 which extend through the arms of a bifurcated base member 16. The base member 16 is adapted for vertical movement by suitable means (not shown) to adjust the height of the apparatus with respect to the cable 15. The pins 23—23 and 24—24, are located such that the apparatus is approximately balanced in both planes about the base member 16. Normally, when soldering uniformly moving cable, the cruciform member 14 is substantially parallel to the cable 15, although a predetermined tilt may be established to allow for a temperature gradient, as will be explained herebelow. The common support 13 is normally maintained perpendicular to the cable 15. As shown in FIG. 1, the cable 15 travels from left to right with the cable seam cooling device (not shown) being located just to the right of the square end 26 of the coil 11.

Figure 3:
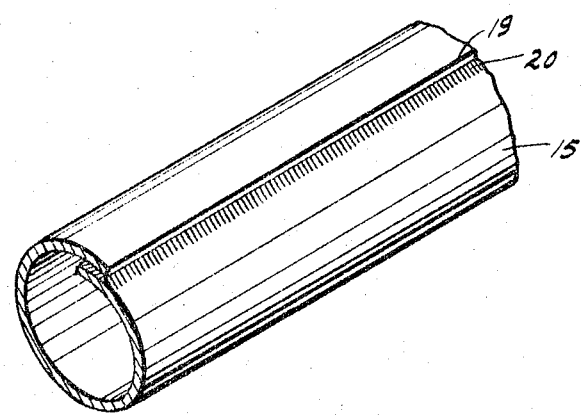
FIG. 3 is a section of a typical sheathed cable showing the nature of the cable seam.

FIG. 3 depicts a typical section of the cable 15 and clearly shows the nature of the cable seam 19 and the position of the solder 20 thereunder.

Referring again to FIGS. 1 and 2, a pair of shoes 17 and 18 are located at the entering and exiting ends of the coil 11 respectively, and are forced into engagement with the cable 15 by means of a pair of spring loading devices 27 and 28. The coil 11 and the common support 13 are caused to rotate about the two axes by the action of shoes 17 and 18, as will be described herebelow.

The shoes 17 and 18 are connected to a pair of rods 31 and 32 respectively, which pass through apertures in a rigid insulated member 33, upon which the coil 11 is directly mounted. The rods 31 and 32 pass through the spring loading devices 27 and 28 and are connected to the upper ends of a second pair of rods 34 and 35 whose lower ends are fastened to the insulated member 33.

The spring loading devices 27 and 28 are mounted on a rigid fixed plate 29 which is mounted on a common support (not shown) with the base member 16 and may therefore be raised and lowered with respect to the cable 15 by the same mechanism (not shown) which raises and lowers the bifurcated base member 16, as discussed herebefore.

The spring loading devices 27 and 28 are identical and only device 28 will be described in detail. Within the device 28 a screw-down cap 36 compresses a spring 37 which exerts pressure on a collar 38 affixed to the lower end of the rod 32 and thereby forces the shoe 18 into surface engagement with the cable 15. The amount of force with which the shoe 18 engages the cable 15 may be varied by adjusting the screw-down cap 36. The upper end of rod 32 is threaded and is engaged by an internally threaded hollow member 45 having an enlarged head at its lower end. A crosspiece 46, to which the upper end of the rod 35 is attached, is fitted loosely about the member 45 such that the bottom surface of the crosspiece engages the head of the member 45. By rotating the threaded member 45 so that it moves upward or downward along the rod 32, the rod 35 may be raised or lowered to adjust the right side of coil 11 with respect to the cable seam 19 without disturbing the left side adjustment. A knurled nut 40 which engages the threaded upper end of the rod 32 above the member 45 may be tightened against the member to maintain the adjustment. The nut 40 also presses against a coil spring 47, positioned about the member 45 above the crosspiece 46, to bias the crosspiece against the head of the member 45. The spring provides additional yield in the parts in case, for example, there is a sudden enlargement of the cable diameter. The left side of coil 11 may be adjusted in a similar manner by member 48.

The spring constant of the spring 37 need not be the same as the constant of the corresponding spring in the device 27. It may, in some circumstances, be advantageous to exert a greater force on the right-hand shoe 18 to assure a greater tendency for the shoe to follow the cable 15 at the exit end of the coil. The rod 34 is provided with a turnbuckle 42 so that the left-hand side of the coil 11 may be quickly raised or lowered without disturbing any preestablishd setting of the member 48. Typically, this will be done to restart the cable soldering operation after the cable has been halted. Turnbuckle 42 may be rotated by automtic means, if so desired. For example, the turnbuckle 42 could be provided with teeth engageable by a gear operable in response to a signal.

In operation, assuming that the cable 15 is passing through the apparatus at a steady rate, typically 90 feet per minute, the screw-cap 36 is adjusted to force the shoe 18 into a predetermined pressure engagement with the exiting end of the cable 15. A simliar adjustment is made to the device 27 to force the shoe 17 into engagement with the entering end of the cable 15. Member 45 is adjusted to raise the right side of the coil 11 to the desired distance above the exiting end of the cable 15. This distance will be determined by the desired temperature at the soldering location (not shown) immediately to the right of the square end 26 of the coil 11. Member 48 is similarly adjusted to raise the left side of the coil 11 the desired distance above the cable 15. Typically, these distances will not be the same, as it is desirable in practice to provide a temperature gradient along the cable seam passing under heating coil 11. This is done so that the cable seam heats up gradually until it reaches its maximum temperature at the exiting end of the apparatus, thus ensuring a uniformly soldered joint.

When a variation in the diameter of the cable occurs, the varied portion enters under shoe 17 which will yield upwardly or downwardly, causing a similar movement of the heating coil 11. As a result, a substantially constant distance will be maintained between the cable seam 19 and the heating coil 11. The exiting end spacing remains unchanged at this time as the gimbal-type universal pivot about pins 23—23 and 24—24 permits free motion of the shoe 17 without a corresponding movement of the shoe 18.

When the varied portion of the cable reaches the shoe 18, it too will act to maintain a substantially constant coil-to-seam separation regardless of the subsequent action of the shoe 17. Thus, the unique and novel combination of a centrally located gimbal-type universal pivot and two spring loaded shoes riding on the cable permits wholly independent positioning of either end of an induction heating coil in a cable seam soldering apparatus.

It is to be understood that the above-described arrangements are merely illustrative of the application of the principles of the invention. For example, it is obvious that the gimbal-type universal pivot could be replaced with a ball and socket arrangement or any other mechanical movement which permits simultaneous rotation about more than one axis. It is also obvious that if the heating coil were divided into segmented portions, more than two shoes could be used, resulting in greater control of the coil to seam separation. Numerous other arrangements may readily be devised by those skilled in the art which will embody the principles of the invention and fall within the spirit and scope thereof.

What is claimed is:

1. Apparatus for soldering the seam of a moving cable comprising:
   a soldering element,
   means for energizing said element,
   means for holding said soldering element above the path of said moving cable, and
   means, responsive to variations in said cable diameter along a length of cable equal to or greater than the length of said soldering element, for maintaining a predetermined distance between said soldering element and the surface of said cable.

2. A cable seam soldering apparatus according to claim 1 wherein:
said soldering element comprises an induction heating coil,
said energizing means comprises an electrical transformer having a secondary winding connected to the coil, and a primary winding,
said holding means comprises a common support rotatable about an axis lying in a plane parallel to the principal axis of the cable and also about an axis perpendicular to the cable,
said responsive means comprises first and second shoes at either end of the common support adapted to slide on the cable, and
means connected to said first and second shoes and said support for rotating the support about the parallel and perpendicular axes.

3. A cable seam soldering apparatus according to claim 2 wherein:
said common support includes a gimbal-type universal pivot medially located therealong for permitting rotation about the parallel and perpendicular axes.

4. A cable seam soldering apparatus according to claim 3 wherein the apparatus further comprises:
first and second adjustable spring-tensioning means for maintaining said first and second shoes in predetermined pressure contact with the cable.

5. A cable seam soldering apparatus according to claim 4 wherein:
the rotating means connected to said first shoe includes adjustable means for maintaining one end of said coil a predetermined greater distance from said cable than the other end.

6. An apparatus for soldering the seam of a moving cable which comprises:
an induction heating coil,
means for energizing said heating coil,
means for maintaining the coil in axial alignment with, and above, said moving cable,
means for supporting said maintaining means, the supporting means being adapted to pivot about more than one axis so that said coil may be moved out of axial alignment with said cable,
said energizing means comprising a step-down transformer having a secondary winding connected to said coil, and
said maintaining means comprising an insulating member supported above said cable by a pair of spring-loaded shoes in surface engagement with said cable.

7. An apparatus according to claim 6, wherein the apparatus further comprises:
a bifurcated base member, and
means for raising and lowering said bifurcated base member with respect to said cable, and
said supporting means comprises,
a shaft pivotally mounted between the arms of said bifurcated member for rotation in a plane parallel to the principal axis of the cable, and
a transformer platform having downwardly extending portions pivotally mounted on said shaft for rotation in a plane perpendicular to the cable.

8. Apparatus for soldering the seam of a moving electrical cable which comprises:
a fixed plate above the path of said moving cable and parallel to the principal axis thereof,
a pair of spring-actuated loading devices connected to said plate at spaced apart locations therealong, each device having a movable shaft axially positioned therein,
a pair of shoes connected to the lower ends of said shafts and forced thereby into a surface engagement with said cable,
means for heating said cable seam to a predetermined temperature,
a plate for supporting said heating means,
a pair of rods connecting the upper ends of said shafts to said stiffening plate,
means for altering the length of one of said pair of rods to tilt one end of said heating means away from said cable, and
pivotal means connected to said supporting plate to permit rotation of said heating means in planes parallel and perpendicular to the axis of said cable.

9. The apparatus according to claim 8 wherein said heating means comprises:
an induction heating coil,
a step-down transformer having a secondary winding connected to said coil,
means for preventing the temperature of said induction heating coil from exceeding said predetermined temperatures, and
said pivotal means comprises a gimbal-type universal pivot.

10. The apparatus according to claim 9 wherein:
said induction heating coil has a hollow cross-section, and
said preventing means comprises a system for forcing a coolant through said hollow cross-section coil.

11. A cable seam bonding apparatus comprising:
an elongated heating means disposed generally parallel to the cable, adjacent the cable seam;
a pair of members arranged to engage the cable along the cable seam adjacent the corresponding ends of said elongated heating means, said members being movable in response to radial variations in the path of the cable seam;
means connected to each of said members for supporting corresponding ends of said elongated heater in predetermined positions with respect to the path of the cable seam, said supporting means being responsive to movement of said members in response to radial variations in the path of the cable seam to maintain a predetermined spacing between corresponding ends of said elongated heating means and the cable seam; and
means for restraining said elongated heating means from transverse and longitudinal movement with respect to the path of the cable, said restraining means being rotatable about a first axis parallel to the path of the cable and also about a second axis generally perpendicular to said first axis and to the path of the cable seam, so that said predetermined spacing at either end of said heating means can be maintained without affecting the spacing at the opposite end.

References Cited

UNITED STATES PATENTS

| 2,582,955 | 1/1952 | Body | 219—9.5 X |
| 2,758,189 | 8/1956 | Hughes | 219—85 |
| 2,801,316 | 7/1957 | Hughes | 219—9.5 |
| 3,203,085 | 8/1965 | Turner | 219—9.5 X |

JOSEPH V. TRUHE, Primary Examiner

B. A. STEIN, Assistant Examiner

U.S. Cl. X.R.

219—10.79, 85